United States Patent
Maheshwari et al.

(10) Patent No.: US 12,267,242 B2
(45) Date of Patent: Apr. 1, 2025

(54) DYNAMIC LOAD BALANCING BASED ON FLOW CHARACTERISTICS

(71) Applicant: Microsoft Technology Licensing, LLC, Redmond, WA (US)

(72) Inventors: Sumit Maheshwari, Westford, MA (US); Gopi Mallikharjun Bhimavarapu, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/867,452

(22) Filed: Jul. 18, 2022

(65) Prior Publication Data

US 2024/0022514 A1    Jan. 18, 2024

(51) Int. Cl.
*H04L 47/125* (2022.01)
*H04L 43/087* (2022.01)
*H04L 43/0888* (2022.01)
*H04L 47/122* (2022.01)

(52) U.S. Cl.
CPC .......... *H04L 47/125* (2013.01); *H04L 43/087* (2013.01); *H04L 43/0888* (2013.01); *H04L 47/122* (2013.01)

(58) Field of Classification Search
CPC . H04L 47/125; H04L 47/122; H04L 67/1001; H04L 67/1004; H04L 67/1008; H04L 67/1014; H04L 67/101; H04L 67/1025
See application file for complete search history.

(56) References Cited

U.S. PATENT DOCUMENTS 10,084,712 B1 *   9/2018   Li .......................... H04L 43/026
11,582,641 B1 *   2/2023   Alasti ............... H04W 28/0842
(Continued)

FOREIGN PATENT DOCUMENTS

CN    109729017 A  *  5/2019
EP       3416336 A1 * 12/2018    ............. G06N 20/00

OTHER PUBLICATIONS

Shi, "Sequence-preserving adaptive load balancers", Jan. 2007 (Year: 2007).*

(Continued)

*Primary Examiner* — Messeret F Gebre

(57) ABSTRACT

Systems and methods are provided for dynamically balancing workloads among data flow processors based on flow characteristics of data flows. The system determines a flow characteristic score associated with the data flow based on results from deep packet inspection of data packets in the data flow. The system further determines load scores associated with a plurality of processors. A load balancer of the system selects a processor among the plurality of processors for processing the data flow based on the flow characteristic score associated with the data flow. The system monitors workload levels of respective processors by periodically receiving performance data associated with the respective processors. The performance data includes flow characteristic scores of data flows being processed. Based on the current status of the workload distribution among the plurality of processors, the system regenerates load scores and re-balancing the workloads by re-distributing data flows to the respective processors.

20 Claims, 9 Drawing Sheets

(56) References Cited

U.S. PATENT DOCUMENTS

| | | |
|---|---|---|
| 2005/0007954 A1 | 1/2005 | Sreemanthula et al. |
| 2008/0114892 A1 | 5/2008 | Bruno et al. |
| 2015/0163146 A1* | 6/2015 | Zhang .................. H04L 45/125 |
| | | 370/238 |
| 2022/0385579 A1* | 12/2022 | Rangel Augusto ... H04L 47/125 |

OTHER PUBLICATIONS

Lee, "Flow Based Dynamic Load Balancing for Passive Network Monitoring", 2005 (Year: 2005).*

S. Raghul, T. Subashri and K. R. Vimal, "Literature survey on traffic-based server load balancing using SDN and open flow," 2017 Fourth International Conference on Signal Processing, Communication and Networking (ICSCN), Chennai, India, 2017, pp. 1-6 (Year: 2017).*

Prakash, S. W., & Deepalakshmi, P. (2019). Flow-based dynamic load balancing algorithm for the cloud networks using software defined networks. International Journal of Cloud Computing, 8(4), 299-318. (Year: 2018).*

K. Yu, L. He, p. S. Yu, W. Zhang and Y. Liu, "Coupled Tensor Decomposition for User Clustering in Mobile Internet Traffic Interaction Pattern," in IEEE Access, vol. 7, pp. 18113-18124, 2019 (Year: 2019).*

"International Search Report and Written Opinion issued in PCT Application No. PCT/US23/024413", Mailed Date: Sep. 8, 2023, 14 Pages.

* cited by examiner

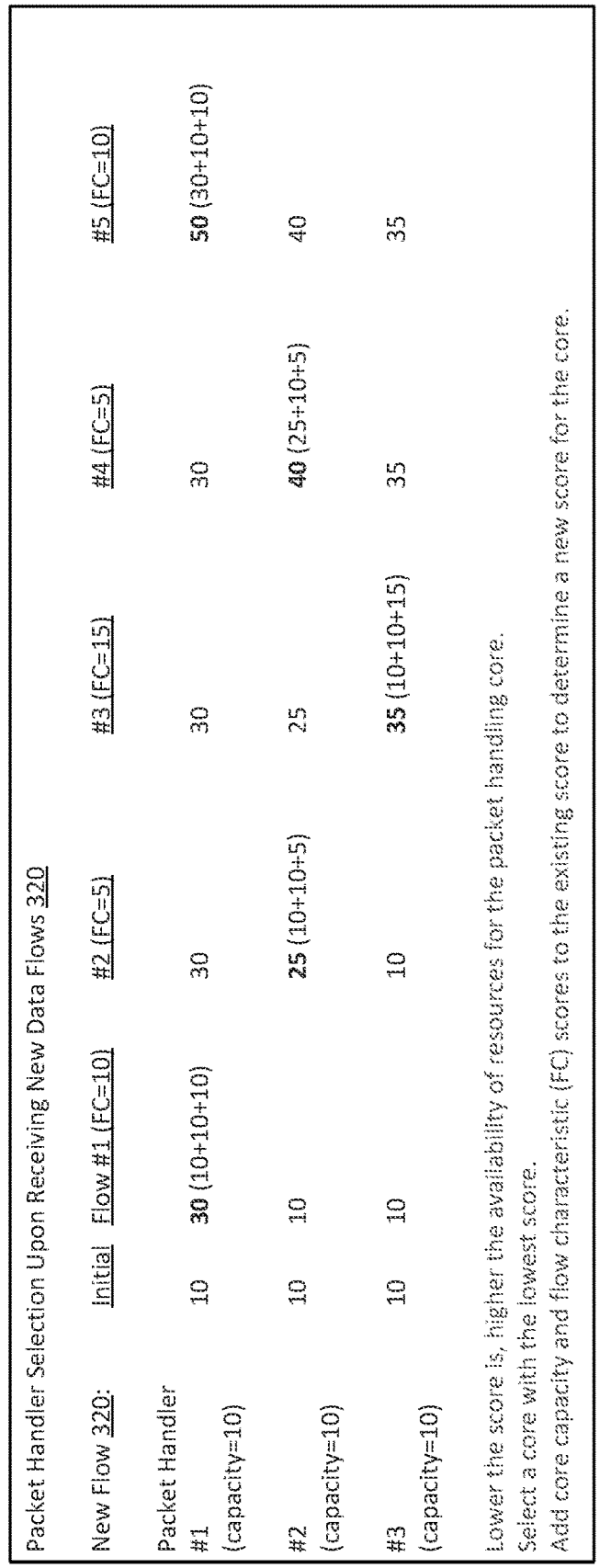

Load Score 310 for a Packet Handler:

$$U = a_1x_1 + a_2x_2 + \cdots + a_nx_n$$

where, $0 \leq a_i \leq 1$, $i \in [1, n]$ and $\sum_{i=1}^{n} a_i = 1$

FIG. 3A

Packet Handler Selection Upon Receiving New Data Flows 320

| New Flow 320: | Initial | Flow #1 (FC=10) | #2 (FC=5) | #3 (FC=15) | #4 (FC=5) | #5 (FC=10) |
|---|---|---|---|---|---|---|
| Packet Handler | | | | | | |
| #1 (capacity=10) | 10 | 30 (10+10+10) | 30 | 30 | 30 | 50 (30+10+10) |
| #2 (capacity=10) | 10 | 10 | 25 (10+10+5) | 25 | 40 (25+10+5) | 40 |
| #3 (capacity=10) | 10 | 10 | 10 | 35 (10+10+15) | 35 | 35 |

Lower the score is, higher the availability of resources for the packet handling core.
Select a core with the lowest score.
Add core capacity and flow characteristic (FC) scores to the existing score to determine a new score for the core.

FIG. 3B

Flow Weight Values for Flow Characteristics 402

| Flow Characteristics 404 | Flow Weights 406 |
|---|---|
| Protocol | 0.2 for TCP and 0.1 for UDP protocol |
| Jitter Sensitivity | 0.200 |
| Latency Sensitivity | 0.200 |
| Minimum Bandwidth | 0.200 |
| Minimum Throughput | 0.200 |

FIG. 4A

Predefined Flow Weights and Flow Characteristic Scores for Applications 410

| App. 420 | Protocol 422 | Jitter Sensitivity 424 | Latency Sens. 426 | Min. Bandwidth 428 | Min. Throughput 430 | Normalized FC Score 434 |
|---|---|---|---|---|---|---|
| A | -- | -- | -- | -- | -- | Default Score |
| B | -- | 0.05 | 0.2 | 0.15 | 0.1 | Default Score |
| C | UDP | 1 | 1 | 1 | 1 | 0.9 |
| D | UDP | 1 | 1 | 1 | -- | 0.7 |
| E | -- | -- | 1 | 1 | -- | 0.2 |
| F | TCP | -- | -- | -- | -- | 0.4 |
| Unspecified | | | | | | 1/(Max. # flows in a core) |

FIG. 4B

DYNAMIC LOAD BALANCING BASED ON FLOW CHARACTERISTICS

BACKGROUND

Load balancing among servers and processors has been widely used for maintaining an efficient use of computing resources in systems. Traditional techniques for load balancing include determining a processor for processing incoming data based on various methods including using a hash function, using a round-robin approach, or identifying a processor with low resource utilization among processors, and the like. For servers processing relatively homogenous data (e.g., product listings downloaded from a web server), resource utilization may be relatively comparable across servers. However, with ever-increasing network speeds and device processing capacities, the number and type of data communications between devices has also increased. For example, data communications may range from video streaming, which is processing-intensive and low-latency dependent, to static content transmissions such as email or text messages, which require minimal processing and tolerate high latency. Thus, the processing needs of different data communications vary. For example, a core network server of a telecommunications network may receive and process a variety of different types of data communications with varying degrees of resource utilization. Accordingly, there is a need for dynamic workload balancing among the core network servers and/or among packet handlers in the respective core network servers to efficiently handle the volume and variety of data communications.

It is with respect to these and other general considerations that the aspects disclosed herein have been made. In addition, although relatively specific problems may be discussed, it should be understood that the examples should not be limited to solving the specific problems identified in the background or elsewhere in this disclosure.

SUMMARY

Aspects of the present disclosure relate to a system for dynamic load balancing among processors based on flow characteristics of data communications in a network. The system performs deep packet inspection upon receiving a data flow to determine a flow characteristic score associated with the data flow. The system further determines load scores associated with respective servers and processors (e.g., packet handlers of a core network server). A load balancer of the system selects a processor among a plurality of processors for processing the data flow based on the flow characteristic score associated with the data flow and the relative load scores of the processors.

The system monitors workload levels of respective processors by periodically receiving performance data. A feedback generator stores the performance data and causes a score generator to update workload scores associated with the respective processors based on the performance data. A core selector, based on the updated workload scores and the flow characteristic scores of incoming data flows, dynamically selects respective processors that are better suited for processing particular types of incoming data flows.

The phrase "packet handler" refers to at least a portion of a physical or virtual server, processor, memory, and the like, associated with processing data flows. A "data flow" or "data communication" includes a series of data packets associated with a communication session over a network.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

FIGS. 3A-B illustrate example data structures associated with scoring for core selection in accordance with aspects of the present disclosure.

FIGS. 4A-B illustrate an example data structures associated with flow weight values in accordance with aspects of the present disclosure.

Figure 5A:
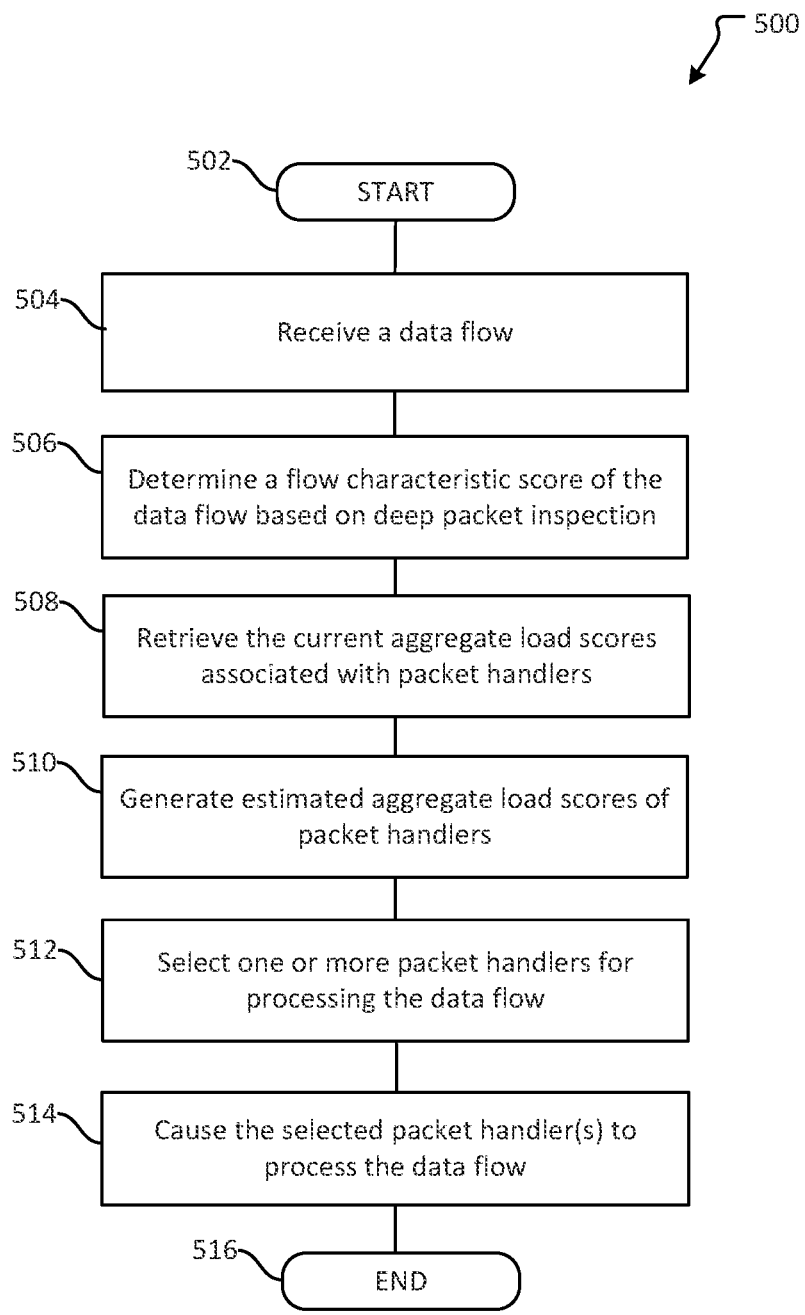
Figure 5B:
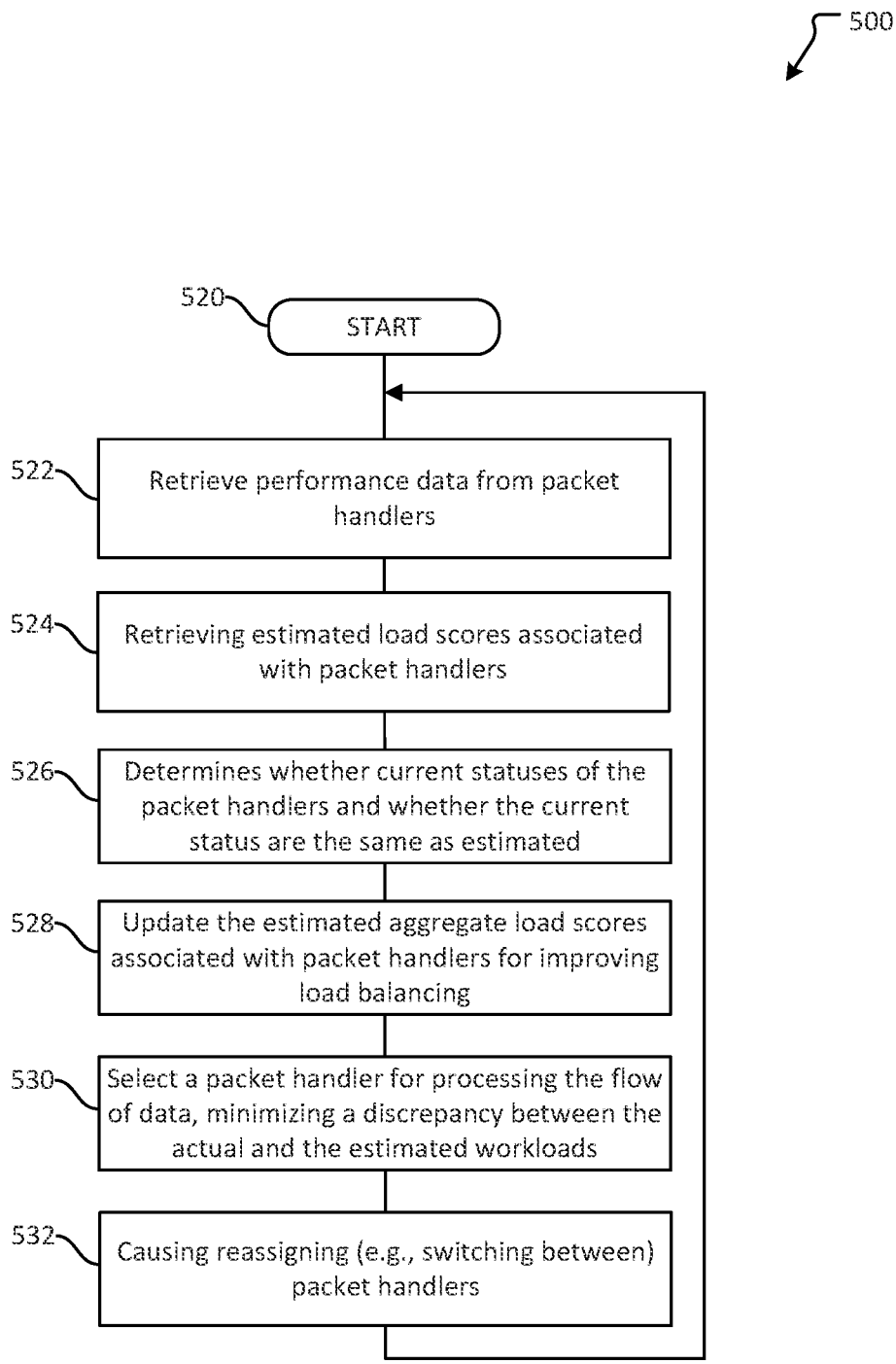

FIGS. 5A-B illustrate examples of methods for dynamically balancing loads for packet handlers in accordance with aspects of the present disclosure.

Figure 6:
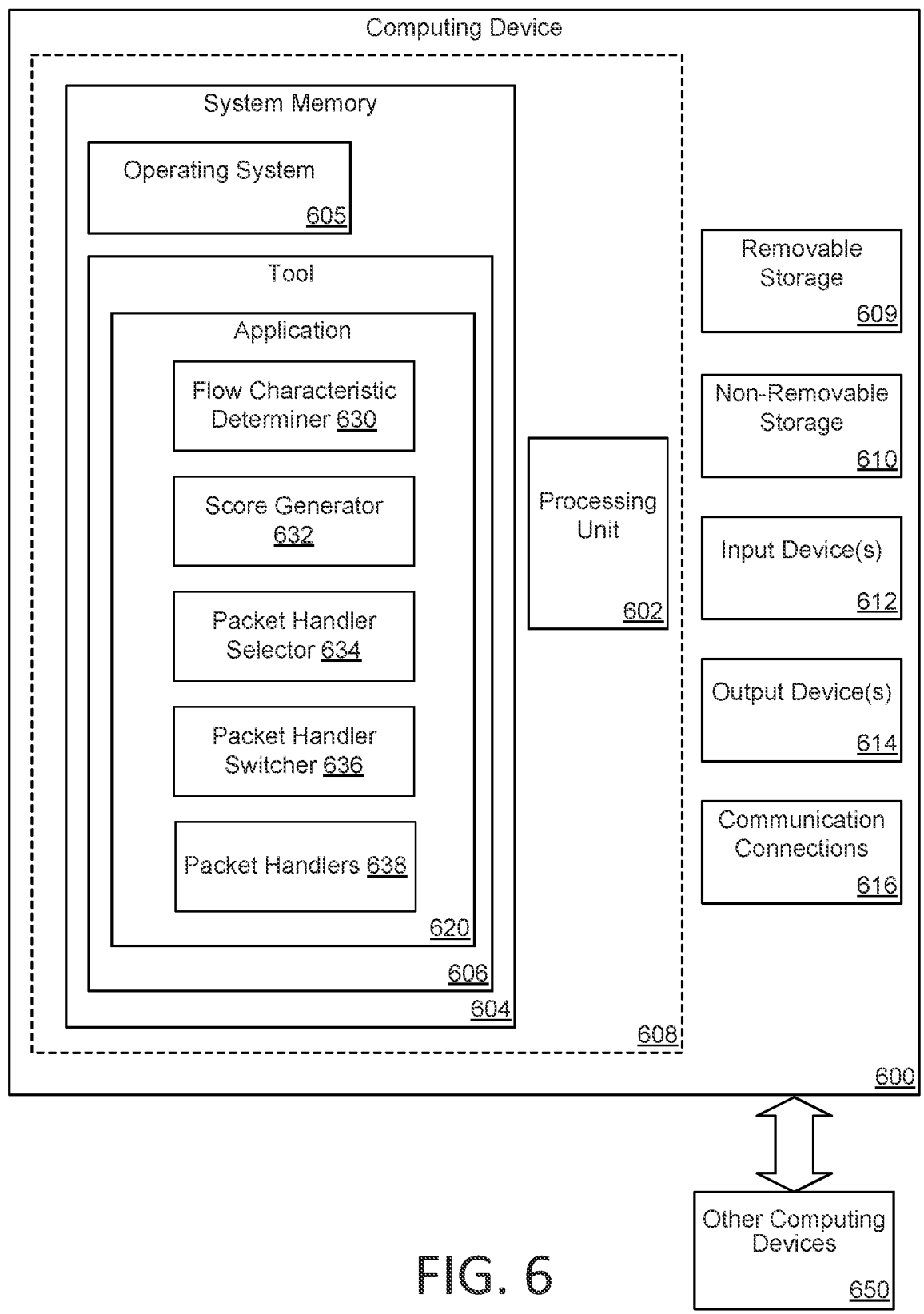

FIG. 6 is a block diagram illustrating example physical components of a computing device with which aspects of the disclosure may be practiced.

Figure 7A:
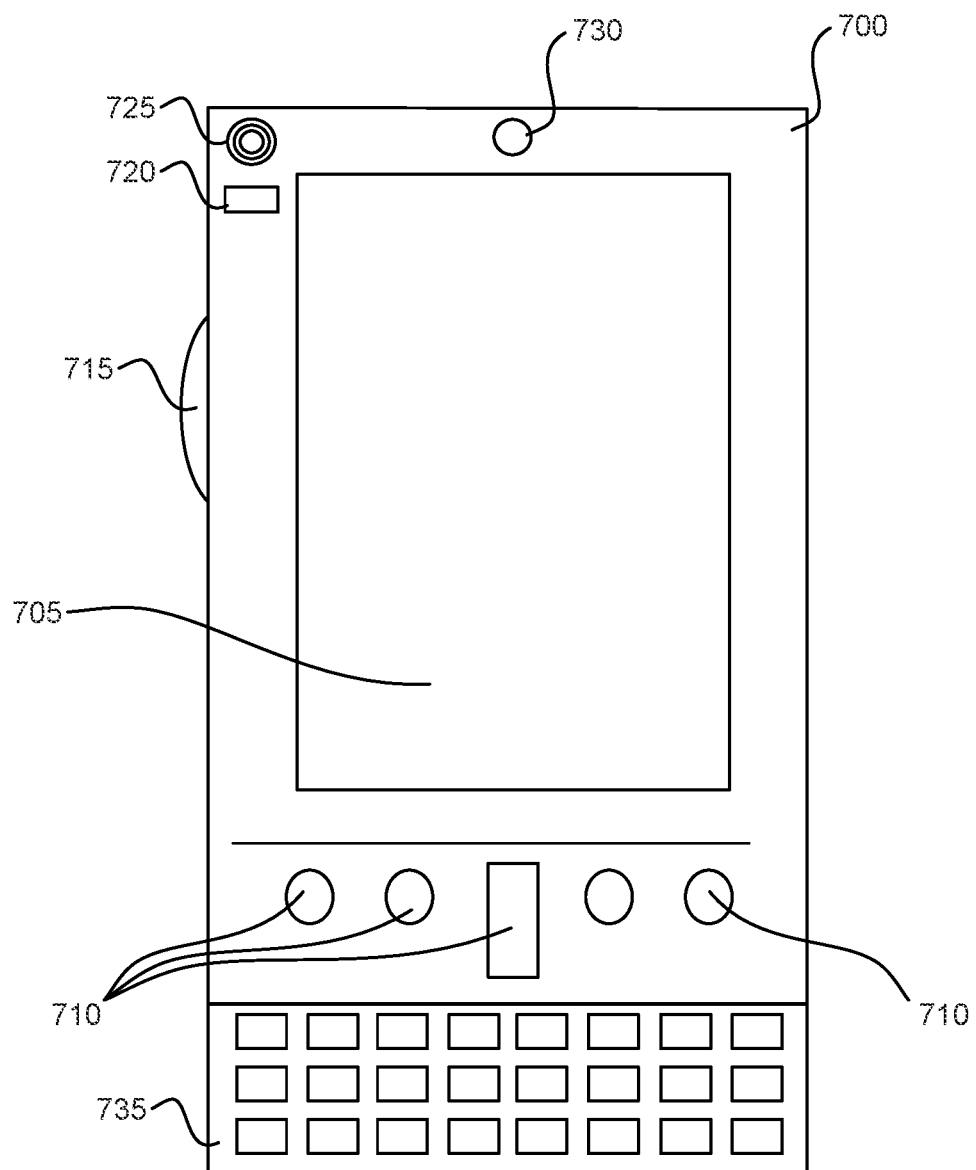

FIG. 7A is a simplified diagram of a mobile computing device with which aspects of the present disclosure may be practiced.

Figure 7B:
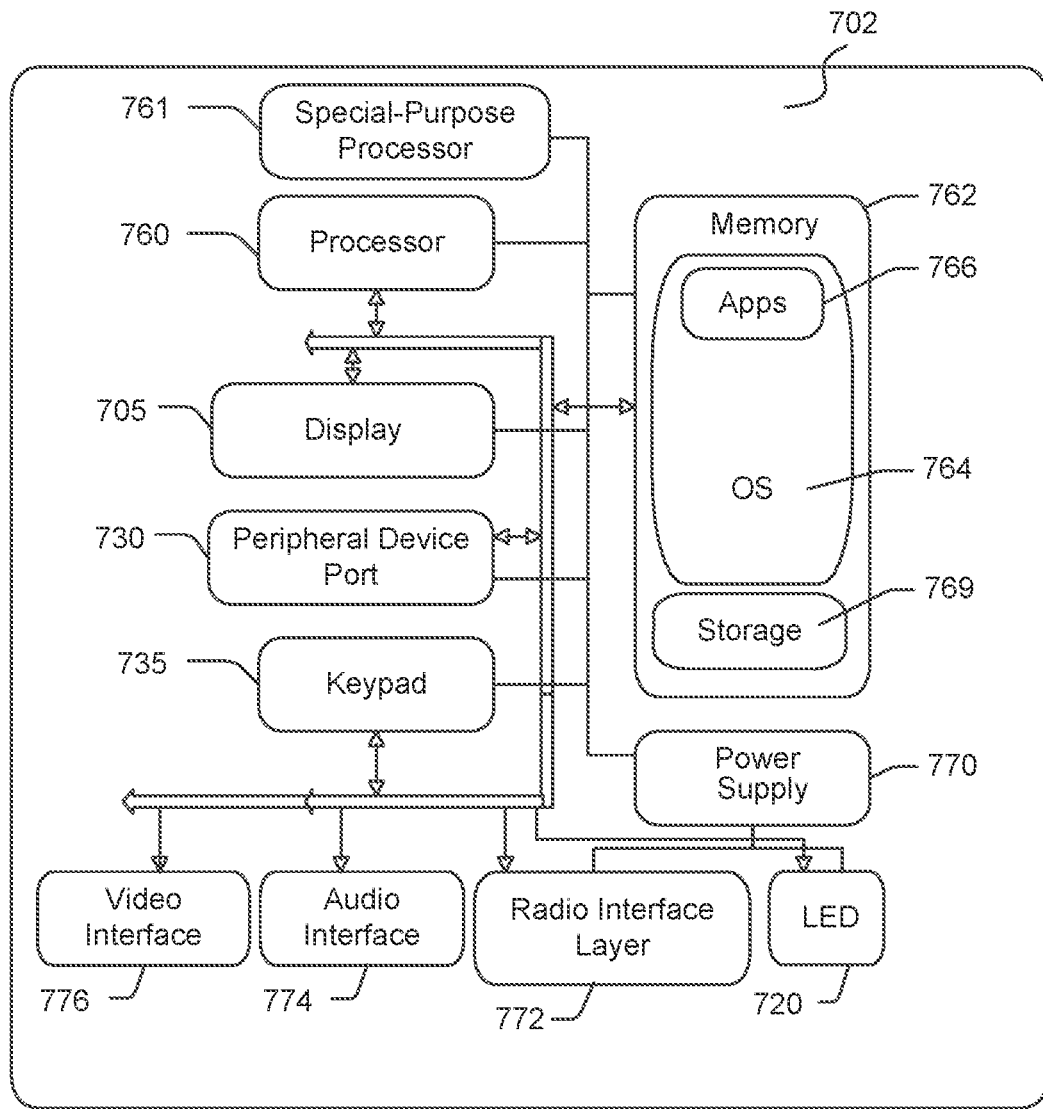

FIG. 7B is another simplified block diagram of a mobile computing device with which aspects of the present disclosure may be practiced.

DETAILED DESCRIPTION

Demand for integration between a cloud network and a radio access network (RAN) and/or a core network for wireless telecommunications has rapidly increased. The RAN provides wireless connectivity to mobile computing devices by converting radio signals into data packets. The core network coordinates among various parts of the RAN and provides connectivity to a packet-based network (e.g., the Internet). Traditional wireless telecommunications systems deployed servers with hardware that was specialized to particular types of processing and was typically built with a capacity to accommodate an estimated peak load of the network traffic. Use of cloud network technology, particularly virtual server technologies, has enabled decoupling of at least some wireless data processing from specialized hardware onto general-purpose servers.

With the advent of 5G, which is a system of mobile communications that improved upon aspects of the previous 4G system (reduced latency, increased bandwidth, etc.), the scope of mobile networks has increased to provide a broad range of wireless services delivered across multiple platforms and multi-layer networks. 5G specifications outline a host of performance requirements related to bandwidth, peak data rate, energy efficiency, reliability, latency (both user-plane and control-plane latency), traffic capacity, etc. To meet these requirements, the RAN architecture has expanded. For instance, Multi-Access Edge Computing (MEC) brings applications from centralized datacenters to the network edge, closer to end users. MEC provides low latency, high bandwidth, and real-time access to RAN information.

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Practicing aspects may be as methods, systems, or devices. Accordingly, aspects may take the form of a hardware implementation, an entirely software implementation or an implementation combining software and hardware aspects. The following detailed description is, therefore, not to be taken in a limiting sense.

Traditional technologies for load balancing may be based on a predefined static flow distribution table or flow selection based on a stateless machine, without receiving feedback from other modules. Other solutions included a weight-based mechanism; however, the weights are statically assigned per flow and are not updated during run-time. Issues in load balancing based on the traditional techniques arise when flow characteristics vary among the data flows. For example, some data flows include video streaming, while other data flows include email content. CPU utilization varies substantially among these different types of data flows. For example, video streaming requires relatively high resource availability for a period of time in packet handlers, which complicates load balancing among processors. Thus, evaluating the types and requirements of incoming data flows, in addition to current processor loads, enables a telecommunications network to better handle a wide variety of incoming data flows while meeting performance metrics (e.g., latency, jitter, and the like).

As discussed in more detail below, the present disclosure relates to dynamically balancing load levels for processing data flows among a plurality of packet handlers (e.g., physical or virtual servers, processors, and the like) in a network based on flow characteristics of the data flows. In particular, the disclosed technology performs a deep packet inspection upon receiving a data flow and determines a flow characteristic score that represents flow characteristics of the data flow. For instance, the flow characteristic score indicates, based on a flow type of the data flow, a degree of resource utilization and processing time on packet handlers.

A data flow may correspond to a data connection between a client computing device (e.g., mobile cellular device, laptop, tablet, and the like) and an application server. A type of a data connection of a data flow may be based on Internet Protocol (IP), Transmission Control Protocol (TCP), User Datagram Protocol (UDP), Quick UDP Internet Connections (QUIC), or other protocols. Attributes that characterize a data flow may include a degree of sensitivity to latency, a degree of sensitivity to jittering, a degree of bandwidth consumption, a degree of CPU utilization, a degree of data throughput, and the like.

Data flows including voice/video, video streaming, live multi-player gaming apps, and the like, depend on low latency connections and require faster CPU cycling in comparison to other types of data flows (e.g., FTP, MAIL, SMTP, POPS). In aspects, a flow characteristic score for high-demand data flows may be high whereas a flow characteristic score for low-demand data flows may be low.

According to the present disclosure, a first packet handler having a lower current load may be dynamically selected for an incoming data flow having a higher flow characteristic score, whereas a second packet handler having a higher current load may be dynamically selected for an incoming data flow having a lower flow characteristic score. In this way, an aggregate load score (a combination of current load and flow characteristic score) for each of the first and second packet handlers may be similar, or balanced. Thus, the present disclosure is able to meet the varied demands of different data flows while also maintaining resource balance across the system.

As detailed above, in traditional load balancing, a processor for an incoming data flow may be selected based on a round-robin approach, a hash-based approach, a level of CPU utilization, and the like. Issues arise when some data flows require more resource-intensive processing or processing over an extended period of time and, thus, occupy an assigned processor at a higher load level for a longer time period. As a result, incoming data flows cannot be assigned to these lagging processors, causing over-loading of other processors, unbalanced load distribution for the system, buffering due to processor assignment delays, jittering, latencies, and the like.

In contrast, the disclosed technology dynamically selects a packet handler among a plurality of packet handlers based on an aggregate load score representing a current load capacity of the packet handler and the flow characteristic score of the incoming data flow. Use of the flow characteristic score of an incoming data flow enables the system to compare packet handlers based on an estimated aggregate load score for processing the incoming data flow. In this way, the system is able to dynamically select a packet handler that is predicted to handle the incoming data flow while maintaining overall load balancing across the system. That is, in some cases, the system may dynamically select a packet handler with a higher actual aggregate load score when a flow characteristic score of an incoming data flow requires minimal computing resources (e.g., an e-mail message). In this way, the system may preserve some packet handlers having a lower actual aggregate load scores to handle incoming data flows with greater resource needs (e.g., video streams), while still promoting load balancing across distributed packet handlers. The disclosed technology periodically updates the actual aggregate load scores to switch packet handlers for processing the data flow based on feedback from the plurality of packet handlers.

The disclosed technology thus leverages results of deep packet inspection (DPI) of data flows and a scoring mechanism to dynamically assign data flows to packet handlers that satisfy the needs of the data flows while also promoting load balancing across the system. That is, based on the dynamic data flow distribution among packet handlers, load levels of the packet handlers are also dynamically balanced, minimizing under- or over-utilization of packet handlers. Furthermore, by periodically reassessing aggregate load scores of the packet handlers, flow switching may be used to enhance the dynamic assignment of data flows and further promote load balancing based on a feedback loop.

Figure 1:
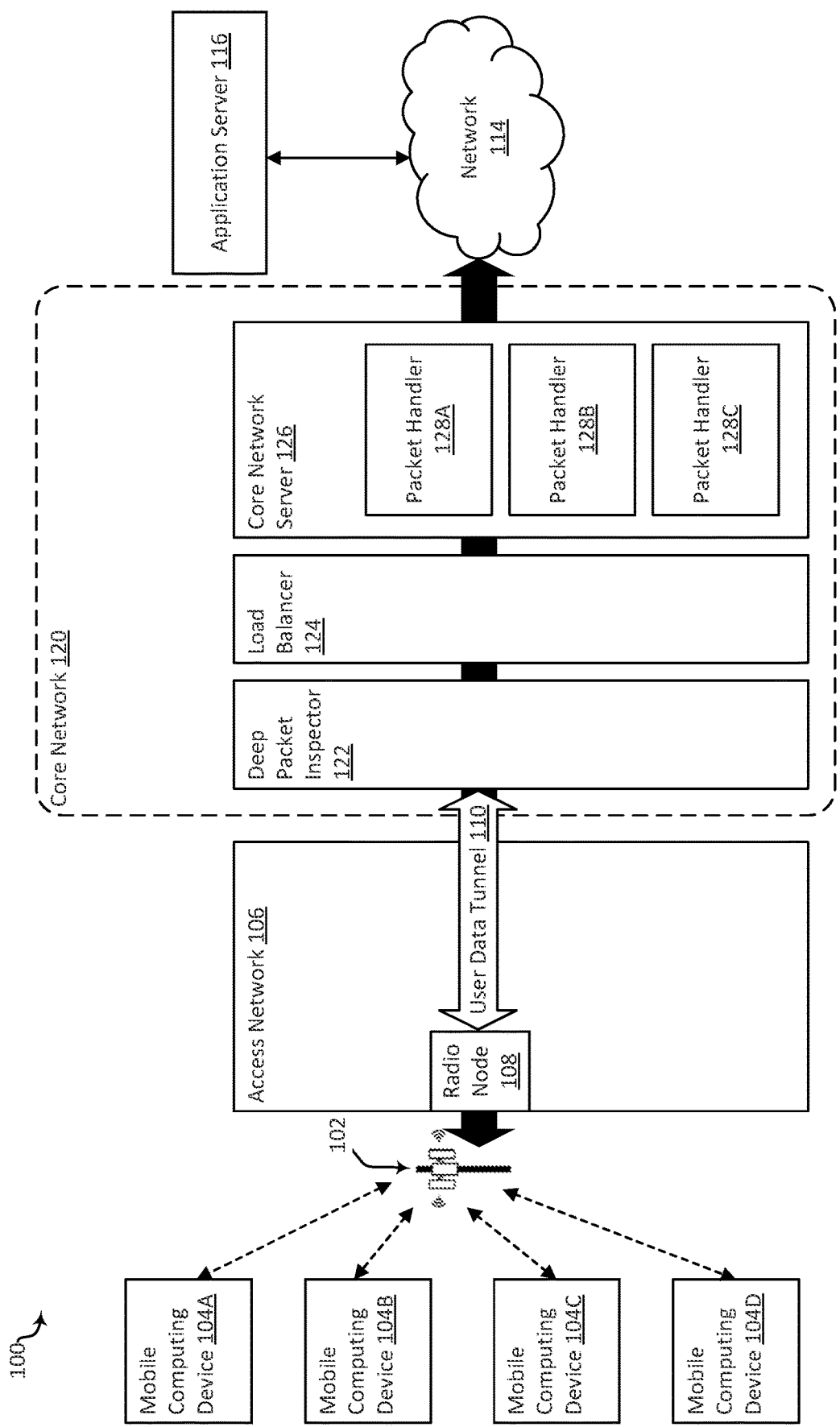
FIG. 1 illustrates an overview of an example system for dynamic load balancing based on flow characteristics in accordance with aspects of the present disclosure.

FIG. 1 illustrates an overview of an example system for dynamic load balancing based on flow characteristics of incoming data flows in accordance with aspects of the present disclosure. A system 100 includes mobile computing devices 104A-D, respectively connected to a cell tower 102 via a wireless network. Examples of the wireless network may include but are not limited to a cellular wireless network. The system further includes an access network 106, a core network 120, a public or private network 114, and an application server 116. The cell tower 102 connects to the access network 106. The access network 106 connects to the core network 120. The core network 120 connects to the public or private network 114, which connects to the application server 116.

The access network 106 includes a radio node 108 and a user data tunnel 110. The radio node 108 connects data transmission of user data between user equipment (UE, e.g., the mobile computing devices 104A-D) and the core network 120 through the user data tunnel 110. Examples of the radio node 108 include eNB in the 4G network and gNB in the 5G network. In aspects, the radio node 108 includes the cell tower 102. Examples of the user data tunnel 110 includes a General Packet Radio Service (GPRS) Tunneling Protocol User Plane (GTP-U) tunnel in the 4G/5G networks. Data traffic based on data packets including user data between the mobile computing devices 104A-D and the application server 116 flow through the user data tunnel 110.

The core network 120 includes a deep packet inspector 122, a load balancer 124, and a core network server 126. The core network 120 connects the access network 106 that includes radio access interfaces to the public or private network 114. The core network 120 includes a core network server 126, which may process subscriber information, data communication sessions, billing information, quality of services, masking IP addresses of mobile computing devices from public IP addresses, and the like, for providing telecommunication services.

The deep packet inspector 122 receives data flows from the access network 106 through the user data tunnel 110 and inspects attribute values and data in headers and sub-headers of data packets in the respective data flows. Results of the deep packet inspection include a type of data transmission (e.g., TCP, UDP, QUIC), an application associated with the data flow (e.g., a video streaming application, an email application, a chat application), and the like. The results may further include parameters associated with processing the data flow based on a data flow type and the application. Examples of the parameters may include a jittering sensitivity, a latency sensitivity, a bandwidth consumption, a throughput of the data flow, CPU cycling speed, and the like. For example, a data flow that include video streaming may have a higher degree of the jittering sensitivity, the latency sensitivity, the throughput than a data flow including email data.

The load balancer 124 balances workload levels among processors (e.g., packet handlers 128A-C) of the core network server 126 based at least on flow characteristics of data flows passing through the core network 120. In aspects, the load balancer 124 generates a flow characteristic score associated with an incoming data flow based on the result of a deep packet inspection performed by the deep packet inspector 122. The load balancer 124 selects a processor (e.g., one of the packet handlers 128A-C) for processing the incoming data flow based on the flow characteristic score associated with the incoming data flow and a current aggregate load score of the processor (e.g., a combination of a current processing load and flow characteristic score(s) of data flows currently being processed).

The core network server 126 manages and processes data flows in the core network. For instance, the core network server 126 may manage data sessions, manage subscriber information, generate billing information associated with data flows, manage a quality of service by enforcing a maximum bandwidth and/or a throughput allowed for the data flows, and the like. The core network server 126 includes a plurality of packet handlers 128A-C. Each of the packet handlers 128A-C processes one or more data flows. In aspects, each packet handler (e.g., the packet handler 128A) may correspond to at least a portion of a virtual or physical server, processor, blade of a server, and the like.

The public or private network 114 connects the core network 120 with the application server 116. In aspects, the public or private network 114 includes a variety of network types, including a publicly interconnected network, a wide area network, a local area network, and the like. The public or private network 114 may be a fixed line network, a wireless network, and a combination thereof.

The application server 116 connects with the public or private network 114. The application server 116 may represent a variety of different applications including an FTP server, an email server, a video streaming server, and the like. The application server 116 transmit data to and receive data from the mobile computing devices 104A-D through the core network 120.

According to the present disclosure, dynamic load balancing may be performed for uplink data traffic from the mobile computing devices 104A-D to the application server 116 through the core network 120. However, the disclosed technology is not limited to uplink data traffic. Additionally, or alternatively, dynamic load balancing may be applied to downlink data traffic from the application server 116 through the core network 120 to the mobile computing devices 104A-D.

As will be appreciated, the various methods, devices, applications, features, etc., described with respect to FIG. 1 are not intended to limit the system 100 to being performed by the particular applications and features described. Accordingly, additional controller configurations may be used to practice the methods and systems herein and/or features and applications described may be excluded without departing from the methods and systems disclosed herein.

Figure 2:
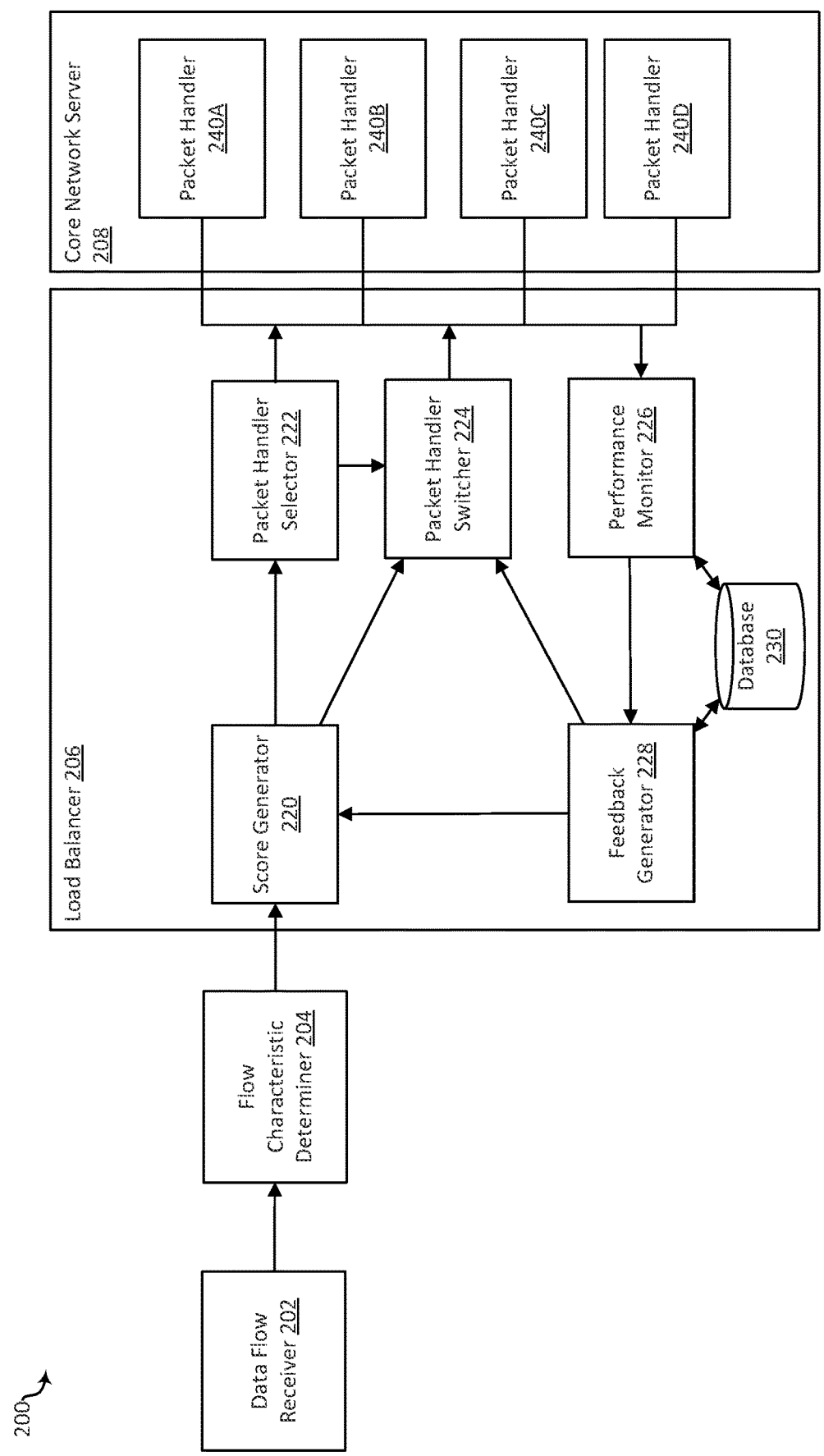
FIG. 2 illustrates an overview of an example system for dynamic load balancing in accordance with aspects of the present disclosure.

FIG. 2 illustrates an overview of an example core network with dynamic load balancing in accordance with aspects of the present disclosure. System 200 includes a data flow receiver 202, a flow characteristic determiner 204 (or deep packet inspector), a load balancer 206, and a core network server 208. In aspects, the data flow receiver 202 receives data flows from an access network (e.g., the access network 106 as shown in FIG. 1).

The flow characteristic determiner 204 determines flow characteristics associated with data flows. Examples of attributes that represent flow characteristics may include resource utilization and processing time, as represented by a data transmission protocol (e.g., TCP, UDP, and the like), a latency tolerance for the data flow, a jitter sensitivity, a bandwidth requirement, a throughput requirement, and the like.

The attributes may further include a name and/or a type of application and/or service associated with the data flow. Examples of applications and/or services include a video streaming service, a chat service, a voice communication application, an email application, a file share application, and the like. The respective applications and/or services may impact flow characteristics associated with data flows. For example, a data flow associated with a video streaming application may have lower latency tolerance than a data flow associated with an e-mail application.

The load balancer 206 dynamically balances workload levels of packet handlers in the core network server 208 by assigning received data flows to one or more packet handlers (e.g., the packet handler 240A, the packet handler 240B, the packet handler 240C, and the packet handler 240D). The load balancer 206 includes a score generator 220, a packet handler selector 222, a packet handler switcher 224, a performance monitor 226, a feedback generator 228, and a database 230.

Based on deep packet inspection, the score generator 220 generates a flow characteristic score associated with each incoming data flow. The score generator 220 further generates or estimates, based at least on the flow characteristic score, aggregate load scores associated with the respective packet handlers. A flow characteristic score indicates aggregated attributes representing flow characteristics of each data flow, reflective of a variety of characteristics (e.g., resource utilization and processing time) of the data flow including a transmission protocol (e.g., TCP, UDP, and the like), a latency tolerance, a jitter sensitivity, a throughput requirement, a bandwidth requirement, and the like.

The flow characteristic score may also indicate a degree of CPU utilization expected in processing a data flow. For example, a higher flow characteristic score indicates a higher predicted CPU utilization than a lower flow characteristic score. In aspects, one or more of the attributes including a lower latency tolerance, a higher jitter sensitivity, a higher bandwidth requirement, and/or a higher throughput requirement may result in a higher predicted CPU utilization. In aspects, a flow characteristic score is based on a weighted aggregate of the attributes that represent flow characteristics of a data flow.

In further aspects, the score generator 220 dynamically generates or estimates aggregate load scores associated with each packet handler based on an actual aggregate load score of the packet handler and a flow characteristic score associated with an incoming data flow that may be assigned to the packet handler (e.g., an estimated aggregate load score is an actual (current) aggregate load score combined with flow characteristic score(s) of data flows currently being processed by the packet handler). In an example, the score generator 220 generates the estimated aggregate load score for each packet handler upon receiving a new incoming data flow.

Additionally, or alternatively, the score generator 220 dynamically updates an actual aggregate load score of each packet handler based on its current resource utilization and the flow characteristic scores of the data flows being processed. The feedback generator 228 generates and communicates with the score generator 220 with data representing the actual, current utilization of the respective packet handlers. The timing of the score generator 220 dynamically updating the actual aggregate load scores may be independent of the timing of receiving an incoming data flow. In this way, the actual aggregate load score takes into consideration not only current resource utilization but the types of data flows currently being handled by the packet handler. That is, a packet handler that is currently processing primarily video streams may maintain its current resource utilization for a longer period of time (e.g., a longer processing time) than another packet handler that is currently processing primarily email data flows, which may be dispatched from the packet handler more quickly.

Processing loads across packet handlers may be maintained at substantially similar levels (e.g., balanced levels) by maintaining estimated and/or actual aggregate load scores at similar levels. In aspects, a range of aggregate load scores may be enforced so as to prevent packet handlers from being over- or under-utilized. For example, a first packet handler with a lower actual aggregate load score may be selected for processing a new data flow with a higher flow characteristic score and/or a second packet handler having a higher actual aggregate load score may be selected for processing a new data flow having a lower flow characteristic score to maintain aggregate load scores for the first and second packet handlers at similar levels, thereby balancing the processing loads across the first and second packet handlers.

In an example, an aggregate load score may be based on an exponentially weighted moving average (EWMA) based on parameters including, CPU utilization, packets per second (PPS), outstanding queue depth, errors detected, burst delay, total packets, a flow characteristic score, and the like. The parameter values may be normalized (e.g., a value between zero and one) to enable comparisons of actual aggregate load scores of packet handlers. In this way, the disclosed technology may dynamically configure weight values associated with the respective parameters during run-time.

The packet handler selector 222 selects one or more packet handlers of a plurality of packet handlers 240A-D of the core network server 208 for processing an incoming data flow. In aspects, the packet handler selector 222 selects the one or more packet handlers based at least on the flow characteristic score associated with the incoming data flow. In some cases, e.g., when the flow characteristic score for an incoming data flow is lower than a predetermined threshold, the packet handler selector 222 may select a packet handler for which the current load level is not the lowest among the packet handlers. In aspects, the packet handler selector 222 selects a packet handler that is more likely than another packet handler to satisfy the estimated load score.

In some other aspects, the packet handler selector 222 selects the one or more packet handlers based on a combination of a flow characteristic score associated with the incoming data flow and actual aggregate load scores of the respective packet handlers. In this case, when the flow characteristic score of an incoming data flow is higher than the predetermined threshold, the packet handler selector 222 may select a packet handler with a lower actual aggregate load score to maintain load balancing across the packet handlers.

The packet handler switcher 224 dynamically compares actual aggregate load scores associated with the respective packet handlers and determines whether to switch an assignment of a data flow from one packet handler to another packet handler. By dynamically switching assigned data flows from one packet handler to another, dynamic optimization of resource utilization in the respective packet handlers may be enabled over time. In aspects, the dynamic switching is based on a predefined set of criteria including a distribution of the actual aggregate load levels among the respective packet handlers, queue lengths of data flows, and the like. The disclosed technology enables moving the data flows among packet handlers as needed based on the feedback from the feedback generator 228.

The performance monitor 226 periodically monitors statuses of resource utilization in the respective packet handlers 240A-D in the core network server 208. Examples of data that represent the statuses include CPU utilization, packets per second (PPS), outstanding queue depth, errors detected, burst delay, total packets, and the like. The performance monitor 226 may capture and store the current statuses of the respective packet handlers 240A-D in a database 230.

The feedback generator 228 may retrieve the current statuses of the respective packet handlers 240A-D from the database 230 and determine whether a load distribution of utilizing the respective packet handlers 240A-D is balanced by classifying the current statuses. The feedback generator 228 may store the status determinations in the database 230. The feedback generator 228 may communicate with the score generator 220 for requesting recalculation of actual aggregate load scores of respective packet handlers 240A-D. The feedback generator 228 may further communicate with the packet handler switcher 224 for switching a data flow from one packet handler to another to dynamically improve the load balancing across packet handlers 240A-D.

The score generator 220 may recalculate and dynamically adjust the aggregate load scores associated with the respective packet handlers by determining a variance (e.g., a discrepancy) between an estimated aggregate load score (based on an estimated processing load of an incoming data flow having a flow characteristic score) and an actual aggregate load score (based on an actual processing load when processing the incoming data flow having the flow characteristic score). The score generator 220 may determine the actual aggregate load scores based on data from the feedback generator 228. The dynamic adjustment of the aggregate load scores may be based on a histogram estimation. In an example, the histogram estimation includes creating bins of packet handlers at different average load score percentage values that are periodically estimated and selecting a packet handler within a determined target bin for a data flow. The estimated histogram may be periodically updated based on feedback for the respective packet handlers 240A-D, as reported by the feedback generator 228. The score generator 220 may also periodically update the actual aggregate load scores associated with the respective packet handlers 240A-D based on the variances (e.g., deltas) between the estimated aggregate load scores and the actual aggregate load scores.

The core network server 208 may include a plurality of packet handlers 240A-D. In aspects, the core network server 208 is a collection of physical and/or virtual servers, physical and/or virtual processors, server blades, memory, and the like. A packet handler (e.g., the packet handler 240A) may correspond to at least a portion of the core network server 208 associated with processing data flows. Additionally, or alternatively, the core network server 208 may be a cloud server in a cloud computing network. In aspects, at least one of the packet handlers 240A-D may execute instructions that correspond to the load balancer 206.

In the examples detailed above, the data flows correspond to uplink data traffic from mobile computing devices (e.g., the mobile computing devices 104A-D as shown in FIG. 1) to the application server (e.g., the application server 116 as shown in FIG. 1), but the disclosure is not so limited. The data flows may include downlink data traffic from the application server to the mobile computing devices. In other aspects, the dynamic load balancing based on flow characteristics of data flows is not limited to a core network of a telecommunications network. The dynamic load balancing based on flow characteristics applies to other network configurations besides the core network.

FIGS. 3A-B illustrate example data structures associated with scoring for core selection in accordance with aspects of the present disclosure. FIG. 3A illustrates an example calculation 300A for determining a load score 310 associated with a packet handler.

In aspects, determining a load score may use a utilization function:

$$U = a_1 x_1 + a_2 x_2 + \ldots + a_n x_n,$$

where $0 \leq a_i \leq 1$, $i \in [1,n]$ and $\sum_{i=1}^{n} a_i = 1$.

As such, the disclosed technology may use a mixed-integer linear programming (MILP) algorithm to determine a load score (e.g., an aggregate load score). Values $x_i$ are the attributes of determining a load score for a packet handler, each attribute having a weight $a_i$. In aspects, the values $x_i$ are normalized scores with a value between zero and one.

In aspects, the disclosed technology determines a load score by solving a problem based on the MILP algorithm and selects a packet handler from a plurality of packet handlers. Additionally, or alternatively, the disclosed technology selects a packet handler based on the traditional use of hash functions (e.g., Flower-Noll-Vo (FNV) hash and/or Jenkins hash functions) and then, after a predetermined time lapse, rebalances the load levels among the plurality of packet handlers using the load scores.

FIG. 3B illustrates examples of aggregate load scores in accordance with aspects of the present disclosure. A table 300B illustrates selecting packet handlers upon receiving new data flows (320). The table 300B indicates an initial set of aggregate load scores based on the baseline capacity utilization and updated sets of aggregate load scores as the core network receives five example new data flows (e.g., data flows #1, #2, #3, #4, and #5) in sequence. Time lapses from the left column to the right as new data flows are received as packet handlers are selected for the respective new data flows and new estimated aggregate load scores are determined. In the example, there are three packet handlers, first packet handler (#1), second packet handler (#2), and third packet handler (#3), each including a baseline capacity utilization score (e.g., a baseline load score) of ten (10), which represents a baseline capacity being utilized in the packet handler for processing data flows. In aspects, the baseline load score of a packet handler is independent of a flow characteristic score of incoming data flows. In further aspects, the baseline load score associated with the respective packet handlers is predetermined.

At an initial time, before assigning incoming data flows #1-#5, the first, second, and third packet handlers have a baseline load score of ten (10).

When a first data flow (#1) with a first flow characteristic score of ten (10) arrives, a first aggregate load score associated with the first packet handler is estimated at thirty (30) based on a sum: ten (10) for the current baseline load, ten (10) for an estimated load for processing the first data flow being assigned, and ten (10) for the first flow characteristic score. In this example, since the baseline load for each of the first, second, and third packet handlers is the same (e.g., ten), selection of the first packet handler for processing the first data flow may be based on a traditional method, such as selection of the packet handler having a lowest ID number (e.g., #1), a round-robin approach, and/or a hash function approach, for example.

When a second data flow with a second flow characteristic score of five (5) arrives, the disclosed technology may select the second packet handler for processing the second data flow. In this example, since the second packet handler and the third packet handler each have baseline load scores of ten (10), which is lower than the first aggregate load score of the first packet handler of thirty (30), a selection may be made between the second and third packet handlers. In this case, the second packet handler may be selected based on a traditional approach, such as having the next lowest ID number (e.g., #2) or as the next packet handler based on a round-robin approach. Upon assigning the second data flow to the second packet handler, a second aggregate load score of the second packet handler may be estimated at twenty-five (25), e.g., a sum of the baseline load score (10), estimated processing load (10) for the second data flow, and the second flow characteristic score (5). In this example, the first aggregate load score associated with the first packet handler remains at thirty (30) due to ongoing processing of the first data flow and baseline processing, and the third aggregate load score of the third packet handler remains at ten (10) based on the ongoing baseline processing.

When a third data flow with a third flow characteristic score of fifteen (15) arrives, the third data flow may be assigned to the third packet handler #3 having the lowest aggregate load score (e.g., baseline load of 10). The third aggregate load score associated with the third packet handler may then be estimated at thirty-five (35), e.g., the sum of the baseline load score (10), an estimated processing load score (10) for the third data flow, and the third flow characteristic score (15). In this case, the first aggregate load score for the first packet handler remains at thirty (30) and the second aggregate load score for the second packet handler remains at twenty-five (25). Note that in this example, the first, second, and third data flows were assigned to the first, second, and third packet handlers in a sequential and/or round-robin fashion since each packet holder started with the same baseline load (e.g., 10). However, the first, second, and third data flows could have been assigned to the first, second, and third packet handlers by another approach, e.g., randomly, since each of the packet handlers had the same baseline load (10).

However, when a fourth data flow with a fourth flow characteristic score of five (5) arrives, the disclosed technology may compare the estimated aggregate load scores of each of the first, second, and third packet handlers to determine which packet handler should be selected for processing fourth data flow. In this case, the second packet handler may be selected to process the fourth data flow because the second aggregate load score of the second packet handler estimated at twenty-five (25) is the lowest among the three packet handlers. Upon assigning the fourth data flow to the second packet handler, the second aggregate load score associated with the second packet handler is estimated to accommodate for processing fourth data flow. Here, the second aggregate load score for the second packet handler is estimated at forty (40), e.g., the sum of the current aggregate load score (25), an estimated processing load score (10) for the fourth data flow, and the fourth flow characteristic score (5). In this example, the first aggregate load for the first packet handler remains estimated at thirty (30) and the second aggregate load score for the third packet handler remains estimated at thirty-five (35).

After the fourth data flow is assigned to the second packet handler, the first packet handler has the lowest estimated aggregate load score of thirty (30) when a fifth data flow having a fifth flow characteristic of ten (10) arrives. In aspects, the first packet handler is selected for processing the fifth data flow. The first aggregate load score for the first packet handler is then estimated at fifty (50), e.g., the sum of the current aggregate load score (30), an estimated processing load (10) for the fifth data flow, and the fifth flow characteristic score (10). The second aggregate load score for the second packet handler remains estimated at forty (40) and the third aggregate load score for the third packet handler remains estimated at thirty-five (35).

As should be appreciated from the examples above, since the baseline loads (10) and the estimated processing loads (10) for processing a new data flow are constants, the assigned flow characteristic scores were determinative when assigning incoming data flows. That is, the selection of packet handlers for processing at least the fourth and fifth data flows would have been the same if the baseline loads and the estimated processing loads were disregarded. In contrast, if actual baseline loads were considered and/or if estimated processing loads were calculated based on the flow characteristic scores of incoming data flows, the selections would be more complex but would still correlate with the flow characteristic scores of incoming data flows.

In aspects, the score generator 220 may periodically update the respective estimated aggregate load scores based on feedback of the current statuses from the feedback generator 228. A time interval for the periodic update of the estimated aggregate load scores for the respective packet handlers may be configurable. For example, a graphical user interface may be provided to interactively receive input for updating a value of the update interval.

FIGS. 4A-B illustrate example data structures associated with attribute weight values in accordance with aspects of the present disclosure. FIG. 4A illustrates example weight values for attributes (or flow characteristics) used in determining flow characteristic scores. A table 400A indicates flow weight values for flow characteristics 402. In particular, the table indicates an association between flow characteristics 404 and flow weights 406. For example, a data transmission protocol attribute indicates a flow weight value of 0.2 for a TCP data transmission protocol and 0.1 for a UDP data transmission protocol. Other flow characteristics may include but are not limited to jitter sensitivity, latency sensitivity, a minimum bandwidth, a minimum throughput, and the like, which are shown in table 400A with a weight value of 0.2000.

In aspects, the flow weights 406 correspond to a coefficient. In an example, a deep packet inspection of an incoming data flow may identify a data transmission protocol (e.g., UDP protocol) and other flow characteristics of the data flow (e.g., jitter sensitivity, latency sensitivity, a minimum bandwidth, a minimum throughput, and the like). In aspects, attribute values may be assigned to the flow characteristics, e.g., ten (10) for a data transmission protocol, ten (10) for jitter sensitivity, fifteen (15) for latency sensitivity, fifteen (15) for a minimum bandwidth, and thirty (30) for a minimum throughput. A flow characteristic score may be a sum of the flow weight multiplied by the attribute value, e.g., transmission protocol (0.1*10=1), jitter sensitivity (0.2*10=2), latency sensitivity (0.2*15=3), minimum bandwidth (0.2*15=3), and minimum throughput (0.2*30=6), which in this example is fifteen (1+2+3+3+6=15). In this case, a flow characteristic score of fifteen (15) may be assigned to the data flow. The flow weights 406 may be predetermined or configurable based on a degree of influence of the respective flow characteristics on balancing the load levels among packet handlers.

FIG. 4B illustrates predefined sets of flow weights and flow characteristic scores for applications and services, in accordance with aspects of the present disclosure. A table 400B indicates flow weights and flow characteristic scores 410 for various applications 420, flow weights for data transmission protocol 422, jitter sensitivity 424, latency sensitivity 426, a minimum bandwidth 428, and a minimum throughput 430. The table 400B further includes a normalized flow characteristic score 434 as a default score for the respective applications. For example, application A uses a predefined default score (not shown) as a flow characteristic score. Application B includes a set of predefined flow weights of 0.05 for jitter sensitivity 424, 0.2 for latency sensitivity 426, 0.15 for the minimum bandwidth 428, and 0.1 for the minimum throughput. In this case, the predefined set of custom flow weights may be applied to flow characteristics that are unique to the application. Application C uses UDP as a data transmission protocol, and a value one (e.g., "TRUE") in other attributes of flow characteristics indicate additional CPU attention needed (thus a higher flow characteristic score) for processing the data flow associated with application C. The normalized flow characteristic score 434 for the application C is predetermined to be 0.9. Other applications with known flow characteristics may be included in the predefined sets of flow weights and normalized flow characteristic scores for efficiently determining flow characteristic scores for incoming data flows, aggregate load scores for packet handlers based on the flow characteristic scores, and subsequent selection of packet handlers for processing the data flows.

As such, predetermined sets of customized flow weights may be assigned to applications and services that process data. Examples of applications and services may include a video streaming application, a chat service, a messaging service, a photo sharing application, a music streaming application, and the like. Distinct applications and services may be assigned with predetermined sets of flow weights for various attributes of flow characteristics. For example, a gaming application relies upon low latency for processing data packets and needs to be assigned to a packet handler with a. CPU with light loaded and low backing queue.

In aspects, a load balancer (e.g., load balancer 206) evaluates the incoming data flows and connections and assigns data flows to packet handlers having lower aggregate load scores before those having higher aggregate load scores. By including flow characteristic scores of data flows in the aggregate load scores, along with updating aggregate load scores based on a feedback mechanism, the flow characteristic scores can influence current and future load balancing decisions as some of the data flows invariably need more or less CPU attention for longer or shorter periods of time. In this way, data flows may be assigned based on yet-to-be-used CPU utilization on packet handlers. With this approach, the disclosed technology enables the load balancer to be more informed about characteristics of the incoming data flows (as well as data flows currently being processed) and thereby can balance the load levels based on intelligent decisions including estimations of future needs.

In aspects, the predetermined flow characteristic scores and the flow weights may be configurable. For example, a graphical user interface may be provided to interactively receive input for updating one or more of the flow weights. One or more administrative tools associated with the load balancer (e.g., the load balancer 206 as shown in FIG. 2) may process input and output to an operator through the graphical user interface.

FIGS. 5A-B illustrate examples of a method for dynamically balancing loads across packet handlers in accordance with aspects of the present disclosure. A general order of the operations for the method 500A for dynamically selecting a packet handler to balance loads among a plurality of packet handlers is shown in FIG. 5A. Generally, the method 500A begins with start operation 502. The method 500A may include more or fewer steps or may arrange the order of the steps differently than those shown in FIG. 5A. The method 500A can be executed as a set of computer-executable instructions executed by a computer system and encoded or stored on a computer readable medium. Further, the method 500A can be performed by gates or circuits associated with a processor, an ASIC, an FPGA, a SOC or other hardware device. Hereinafter, the method 500A shall be explained with reference to the systems, components, devices, modules, software, data structures, data characteristic representations, signaling diagrams, methods, etc., described in conjunction with FIGS. 1, 2, 3A-B, 4A-B, 5B, 6, and 7A-B.

Following start operation 502, the method 500A begins with receive operation 504, in which a data flow is received. In aspects, the data flow may be an uplink data flow from a mobile computing device that wirelessly connects with a cell tower to an application server over the Internet (or other public or private network), via the access network and the core network. In aspects, distinct data flows may have distinct flow characteristics. For example, some data flows may include video streaming, while some other data flows may include a transmission of content of an e-mail.

At determine operation 506, a flow characteristic score associated with the received data flow is determined using deep packet inspection. The data packet inspection may include retrieving header and sub-header data from data packets in the received data flow. Results of the deep packet inspection may include various attributes associated with flow characteristics of the data flow. Examples of the attributes include a data transmission protocol (e.g., TCP, UDP, and the like), jitter sensitivity, latency sensitivity, a minimum (and/or a maximum) bandwidth, a minimum (and/or a maximum) throughput, and the like.

At retrieve operation 508, a set of current aggregate load scores associated with the respective packet handlers are retrieved. The current aggregate load scores may be estimated aggregate load scores and/or actual aggregate load scores based on a feedback mechanism reflecting current statuses of workloads being processed by the respective packet handlers. The current statuses include a representation of resource utilization for ongoing data processing by the respective packet handlers. In aspects, the retrieve operation 508 may cause or be based on updating (e.g., recalculating) previously estimated aggregate load scores based on actual performance data as collected from the respective packet handlers.

At generate operation 510, estimated aggregate load scores associated with the respective packet handlers are generated. The estimated aggregate load scores of the respective packet handlers represent a combination of the current aggregate load scores and the flow characteristic score of the data flow. In some aspects, the estimated aggregate load scores for the respective packet handlers may further include an estimated processing load score for processing the incoming data flow. As noted above, the flow characteristic score is based on a variety of attributes of the data flow including a type of data transmission protocol (e.g., TCP, UDP, and the like), a latency tolerance, a jitter sensitivity, a throughput requirement, a bandwidth requirement, and the like. The flow characteristic score may further represent a degree of CPU utilization for a period of time expected for processing the data flow.

At select operation 512, one or more packet handlers are selected for processing the data flow based on the estimated aggregate load scores associated with the respective packet handlers, which include the flow characteristic score of the data flow. In aspects, a packet handler with the lowest estimated aggregate load score may be selected for processing the new data flow. In some other aspects, a packet handler having an estimated aggregate load score that is higher than the lowest score may be selected, e.g., when the flow characteristic score of the new data flow is less than a predetermined threshold. When a flow characteristic score is less than a predetermine threshold, the new data flow may require minimal processing in the packet handler, e.g., the data flow may be an email transmission. Accordingly, it is sufficient to assign the data flow to a packet handler having a higher estimated aggregate load score. In aspects, the select operation 512 may select more than one packet handler for processing the data flow. When selected, processing for the data flow may be distributed across the more than one packet handler.

At cause operation 514, the selected packet handler(s) may process the data flow. In aspects, the method 500A may end at end operation 516. In aspects, a load balancer (e.g., load balancer 206 of FIG. 2) executes the method 500A when a new data flow is received by a core network.

As should be appreciated, operations 502-516 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

FIG. 5B illustrates an example of a method for dynamically updating estimated aggregate load scores and switching a packet handler. A general order of the operations for the method 500A is shown in FIG. 5B. Generally, the method 500B begins with start operation 520. The method 500B may include more or fewer steps or may arrange the order of the steps differently than those shown in FIG. 5B. The method 500B can be executed as a set of computer-executable instructions executed by a computer system and encoded or stored on a computer readable medium. Further, the method 500B can be performed by gates or circuits associated with a processor, an ASIC, an FPGA, a SOC or other hardware device. Hereinafter, the method 500B shall be explained with reference to the systems, components, devices, modules, software, data structures, data characteristic representations, signaling diagrams, methods, etc., described in conjunction with FIGS. 1, 2, 3A-B, 4A-B, 5A, 6, and 7A-B.

Following start operation 520, the method 500B begins with retrieve operation 522, in which performance data may be received from a plurality of packet handlers in a core network server. The retrieve operation 522 may be executed periodically in a predetermined and/or a configurable time interval. The performance data indicate current statuses of the respective packet handlers. Examples of performance data include CPU utilization (e.g., resource utilization associated with a central processing unit, a processor, a packet handler, and the like), packets per second (PPS), outstanding queue depth, errors detected, burst delay, total packets, a flow characteristic score, and the like. The performance data may be used for monitoring degradation (or upgradation) of packet handlers. The performance data may be stored in a database for further analysis and for determining whether the workloads are balanced among the packet handlers.

At retrieve estimated load scores operation 524, estimated load scores for one or more packet handlers (e.g., processors) is retrieved. The estimated load score is based at least in part on a flow characteristic score of at least one data flow being processed by a packet handler.

At determine operation 526, the current statuses of the respective packet handlers are determined based on the performance data, including whether the actual workloads are the same as the estimated workloads. The current statuses may be classified to indicate a level of load balance among the packet handlers. If the packet handlers are off-balance, the system may determine tore-balanced the packet handlers to improve processing efficiency. Status information based on the performance data may be stored in the database. In aspects, the determine operation 526 occurs in a predetermined and/or configurable time interval, thereby updating the estimated aggregate load scores associated with packet handlers in a periodic manner.

At update operation 528, estimated aggregate load scores associated with the respective packet handlers are updated based on a variance between previously estimated aggregate load scores and the actual aggregate load scores based on the determined current statuses. The update operation 528 updates the estimated aggregate load scores to eliminate or minimize the variance between the estimated aggregate load scores and the actual aggregate load scores to improve load balancing among the respective packet handlers.

At select operation 530, one or more packet handlers are selected for processing the data flow and for dynamically rebalancing workloads among the packet handlers. In aspects, the select operation 530 uses the updated estimated aggregate load scores for selecting the one or more packet handlers, minimizing a discrepancy between the actual and the previously estimated workloads among packet handlers.

At cause operation 532, the data flow may be reassigned from a packet handler that has been processing the data flow to one of the one or more selected packet handlers. The switching dynamically re-balances the workloads among the respective packet handlers. The process returns to the retrieve operation 522 to perform continued evaluation of the system. In aspects, the method 500B may include a timer for waiting a predetermined time (e.g., in a predetermined and/or configurable time interval) before proceeding to the retrieve operation 522.

As should be appreciated, operations 520-532 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

FIG. 6 is a block diagram illustrating physical components (e.g., hardware) of a computing device 600 with which aspects of the disclosure may be practiced. The computing device components described below may be suitable for the computing devices described above. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program tools 606 suitable for performing the various aspects disclosed herein such. The operating system 605, for example, may be suitable for controlling the operation of the computing device 600. Furthermore, aspects of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program tools and data files may be stored in the system memory 604. While executing on the at least one processing unit 602, the program tools 606 (e.g., an application 620) may perform processes including, but not limited to, the aspects, as described herein. The application 620 includes a flow characteristic determiner 630, a score generator 632, a packet handler selector 634, a packet handler switcher 636, packet handlers 638 as described in more details in FIG. 2. Other program tools that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units, and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general-purpose computer or in any other circuits or systems.

The computing device 600 may also have one or more input device(s) 612, such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of the communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program tools. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program tools, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 7A and 7B illustrate a computing device or mobile computing device 700, for example, a mobile telephone, a smart phone, wearable computer (such as a smart watch), a tablet computer, a laptop computer, and the like, with which aspects of the disclosure may be practiced. In some aspects, the client utilized by a user (e.g., the mobile computing device 104A as shown in the system 100 in FIG. 1) may be a mobile computing device. With reference to FIG. 7A, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included as an optional input element, a side input element 715 allows further user input. The side input element 715 may be a rotary switch, a button, or any other type of manual input element. In alternative aspects, mobile computing device 700 may incorporate more or less input elements. For example, the display 705 may not be a touch screen in some aspects. In yet another alternative aspect, the mobile computing device 700 is a portable phone system, such as a cellular phone. The mobile computing device 700 may also include an optional keypad 735. Optional keypad 735 may be a physical keypad or a "soft" keypad generated on the touch screen display. In various aspects, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of computing device, a server (e.g., the core network server 126 and the application server 116, as shown in FIG. 1), a mobile computing device, etc. That is, the mobile computing device 700 can incorporate a system 702 (e.g., a system architecture) to implement some aspects. The system 702 can implemented as a "smart phone" capable of running one or more applications (e.g., browser, e-mail, calendaring, contact managers, messaging clients, games, and media clients/players). In some aspects, the system 702 is integrated as a computing device, such as an integrated digital assistant (PDA) and wireless phone.

One or more application programs 766 may be loaded into the memory 762 and run on or in association with the operating system 764. Examples of the application programs include phone dialer programs, e-mail programs, information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 868 synchronized with corresponding information stored at the host computer. As should be appreciated, other applications may be loaded into the memory 762 and run on the mobile computing device 700 described herein.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world" via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 (e.g., LED) may be used to provide visual notifications, and/or an audio interface 774 may be used for producing audible notifications via the audio transducer 725. In the illustrated configuration, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with aspects of the present disclosure, the microphone may also serve as an audio sensor to facilitate control of notifications, as will be described below. The system 702 may further include a video interface 776 that enables an operation of devices connected to a peripheral device port 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

The description and illustration of one or more aspects provided in this application are not intended to limit or restrict the scope of the disclosure as claimed in any way. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The present disclosure relates to systems and methods for dynamically balancing workloads among packet handlers according to at least the examples provided in the sections below. A computer-implemented method comprises receiving a first data flow, wherein the first data flow includes at least one data packet; determining, using a deep packet inspection upon the at least one data packet, a first flow characteristic score associated with the first data flow, wherein the first flow characteristic score is based on a first weighted aggregate of attributes representing at least a first estimated resource utilization and a first estimated processing time associated with processing the first data flow; generating a first estimated load score associated with a first processor of the plurality of processors for processing the first data flow, wherein the first estimated load score is based at least in part on the first flow characteristic score associated with the first data flow; selecting, based at least on the first estimated load score, the first processor of the plurality of processors for processing the first data flow, wherein the selecting the first processor is based on the first processor being predicted to better satisfy the first estimated resource utilization and first processing time of the first data flow than at least a second processor of the plurality of processors; and causing the first processor to process the first data flow. The computer-implemented method further comprises periodically retrieving performance data associated with the plurality of processors; determining, based on the performance data, actual load scores of the plurality of processors; determining, based on a variance between the actual load scores and estimated load scores of the plurality of processors, to rebalance load levels among the plurality of processors; dynamically updating, based on the variance, the estimated load scores associated with the plurality of processors; selecting, based on the updated estimated load scores, the second processor of the plurality of processors for processing the first data flow; and causing reassignment of the first data flow to the second processor of the plurality of processors. The plurality of processors includes a plurality of packet handlers of a core network server in at least a 5G telecommunication network. The computer-implemented method further comprises receiving a second data flow, wherein the second data flow is distinct from the first data flow; determining, using the deep packet inspection, a second flow characteristic score associated with the second data flow, wherein the second flow characteristic score is based on a second weighted aggregate of attributes representing at least a second estimated resource utilization and a second estimated processing time associated with processing the second data flow, and wherein the second flow characteristic score is distinct from the first flow characteristic score; generating a second estimated load score associated with the second processor of the plurality of processors for processing the second data flow, wherein the second processor is distinct from the first processor; selecting, based at least on the second estimated load score, the second processor of the plurality of processors for processing the second data flow, wherein the selecting the second processor is based on the second processor being predicted to better satisfy a second resource utilization and a second processing time associated with the second data flow than at least a third processor of the plurality of processors; and causing the second processor to process the second data flow. The first flow characteristic score associated with the data flow is based on at least one flow characteristic including at least one of a data transmission protocol, a jitter sensitivity, a latency sensitivity, an application associated with the first data flow, a minimum network bandwidth for data transmission, or a minimum throughput for the data transmission. The first flow characteristic score is based on a weighted aggregate representing at least one flow characteristic of the first data flow. The plurality of processors represents a plurality of servers in a core network. The flow characteristic score is associated with a degree of processor utilization needed for processing the data flow. The deep packet inspection uses a trained classification model for predicting at least one of flow characteristics or the flow characteristic score associated with the data flow. The first data flow includes a stream of uplink data originating from a mobile computing device that wirelessly communicates with a cell tower through an access network in at least a 5G telecommunication network. The first estimated load score is further based at least on numbers of data packets being processed in a predetermined time by respective processors of the plurality of processors, numbers of connections associated with data flows at the respective processors of the plurality of processors, and a utilization rate associated with the respective processors of the plurality of processors.

Another aspect of the technology relates to a system. The system comprises a memory; and a processor configured to execute a method comprising: receiving a first data flow, wherein the first data flow includes at least one data packet; determining, using a deep packet inspection upon the at least one data packet, a first flow characteristic score associated with the first data flow, wherein the first flow characteristic score is based on a first weighted aggregate of attributes representing at least a first estimated resource utilization and a first estimated processing time associated with processing the first data flow; generating a first estimated load score associated with a first processor of the plurality of processors for processing the first data flow, wherein the first estimated load score is based at least in part on the first flow characteristic score associated with the first data flow; selecting, based at least on the first estimated load score, the first processor of the plurality of processors for processing the first data flow, wherein the selecting the first processor is based on the first processor being predicted to better satisfy the first estimated resource utilization and first processing time of the first data flow than at least a second processor of the plurality of processors; and causing the first processor to process the first data flow. The processor further configured to execute a method comprising periodically retrieving performance data associated with the plurality of processors; determining, based on the performance data, actual load scores of the plurality of processors; determining, based on a variance between the actual load scores and estimated load scores of the plurality of processors, to rebalance load levels among the plurality of processors; dynamically updating, based on the variance, the estimated load scores associated with the plurality of processors; selecting, based on the updated estimated load scores, a second processor of the plurality of processors for processing the first data flow; and causing reassignment of the first data flow to the second processor of the plurality of processors. The plurality of processors includes a plurality of packet handlers of a core network server in at least a 5G telecommunication network. The processor further configured to execute a method comprising receiving a second data flow, wherein the second data flow is distinct from the first data flow, wherein the second data flow includes a stream of uplink data originating from a mobile computing device that wirelessly communicates with a cell tower through an access network; determining, using the deep packet inspection, a second flow characteristic score associated with the second data flow, wherein the second flow characteristic score is based on a second weighted aggregate of attributes representing at least a second estimated resource utilization and a second estimated processing time associated with processing the second data flow, and wherein the second flow characteristic score is distinct from the first flow characteristic score; generating a second estimated load score associated with the second processor of the plurality of processors for processing the second data flow, wherein the second processor is distinct from the first processor; selecting, based at least on the second estimated load score, the second processor of the plurality of processors for processing the second data flow, wherein the selecting the second processor is based on the second processor being predicted to better satisfy a second resource utilization and a second processing time associated with the second data flow than at least a third processor of the plurality of processors; and causing the second processor to process the second data flow. The first flow characteristic score associated with the first data flow is based on at least one flow characteristic including at least: a data transmission protocol, a jitter sensitivity, a latency sensitivity, an application associated with the first data flow, a minimum network bandwidth for data transmission, or a minimum throughput for the data transmission.

In still further aspects, the technology relates to a device for dynamically balancing load of processors based on flow characteristics of data flows. The device comprises a memory; and a processor configured to execute a method comprising periodically retrieving performance data associated with a first processor of a plurality of processors; retrieving an estimated load score for the first processor, wherein the estimated load score is based at least in part on a flow characteristic score of at least one data flow being processed by the first processor; determining, based on a variance between an actual load score represented by the performance data for the first processor and the estimated load score for the first processor of the plurality of processors, to rebalance a load level associated with one or more processors of the plurality of processors; dynamically updating, based on the variance, the estimated load score associated with the first processor of the plurality of processors; selecting, based on the dynamically updated estimated load score, a second processor of the plurality of processors for processing the at least one data flow; and causing the second processor of the plurality of processors to process the at least one data flow according to the selection. The plurality of processors includes a plurality of packet handlers of a core network server in at least a 5G telecommunication network. The performance data include at least one of: resource utilization associated with the first processor, packets per second, outstanding queue depth, errors detected, burst delay, or a first flow characteristic score associated with a data flow being processed by the first processor. The flow characteristic score of at least one data flow is based on at least one flow characteristic including a data transmission protocol, a jitter sensitivity, a latency sensitivity, an application associated with the at least one data flow, a minimum network bandwidth for data transmission, or a minimum throughput for the data transmission.

Any of the one or more above aspects in combination with any other of the one or more aspect. Any of the one or more aspects as described herein.

What is claimed is:

1. A computer-implemented method for dynamic load balancing among a plurality of processors, comprising:
   receiving a first data flow, wherein the first data flow includes at least one data packet;
   determining, using a deep packet inspection upon the at least one data packet, a first flow characteristic score of the first data flow, wherein the first flow characteristic score is based on a first weighted aggregate of attributes, the attributes characterize the first data flow according to at least a first estimated resource utilization and a first estimated processing time of the first data flow, and the first weighted aggregate of attributes is based on weighted attributes where weights are configurable based on respective degrees of influence of the attributes on the dynamic load balancing among the plurality of processors;
   generating a first estimated aggregate load score of a first processor of the plurality of processors for processing the first data flow, wherein the first estimated aggregate load score is based at least on a current aggregate load score of the first processor and the first flow characteristic score of the first data flow;
   selecting, based at least on the first estimated aggregate load score, the first processor of the plurality of processors for processing the first data flow, wherein selecting the first processor is based on the first processor being predicted to better satisfy the first estimated resource utilization and the first estimated processing time of the first data flow than at least a second processor of the plurality of processors;
   causing the first processor to process the first data flow;
   determining, based on performance data of the plurality of processors, actual aggregate load scores of the plurality of processors;
   determining, based on a variance between the actual aggregate load scores and estimated aggregate load scores of the plurality of processors, to rebalance load levels among the plurality of processors; and
   dynamically updating, based on the variance, the estimated aggregate load scores of the plurality of processors.

2. The computer-implemented method of claim 1, further comprising:
   periodically retrieving the performance data of the plurality of processors;
   selecting, based on the updated estimated aggregate load scores, the second processor of the plurality of processors for processing the first data flow; and
   causing reassignment of the first data flow to the second processor of the plurality of processors.

3. The computer-implemented method of claim 1, wherein the plurality of processors includes a plurality of packet handlers of a core network server in at least a 5G telecommunication network.

4. The computer-implemented method of claim 1, further comprising:
   receiving a second data flow, wherein the second data flow is distinct from the first data flow;
   determining, using the deep packet inspection, a second flow characteristic score of the second data flow, wherein the second flow characteristic score is based on a second weighted aggregate of attributes representing at least a second estimated resource utilization and a second estimated processing time of processing the second data flow, and wherein the second flow characteristic score is distinct from the first flow characteristic score;
   generating a second estimated aggregate load score of the second processor of the plurality of processors for processing the second data flow, wherein the second processor is distinct from the first processor;
   selecting, based at least on the second estimated aggregate load score, the second processor of the plurality of processors for processing the second data flow, wherein selecting the second processor is based on the second processor being predicted to better satisfy a second resource utilization and a second processing time of the second data flow than at least a third processor of the plurality of processors; and
   causing the second processor to process the second data flow.

5. The computer-implemented method of claim 1, wherein the first flow characteristic score of the first data flow is based on at least one flow characteristic including at least one of:
   a data transmission protocol,
   a jitter sensitivity,
   a latency sensitivity,
   an application associated with the first data flow,
   a minimum network bandwidth for data transmission, or
   a minimum throughput for the data transmission.

6. The computer-implemented method of claim 1, wherein the first flow characteristic score is based on a weighted aggregate representing at least one flow characteristic of the first data flow.

7. The computer-implemented method of claim 1, wherein the plurality of processors represents a plurality of servers in a core network.

8. The computer-implemented method of claim 1, wherein the first flow characteristic score is of a degree of processor utilization needed for processing the first data flow.

9. The computer-implemented method of claim 1, wherein the deep packet inspection uses a trained classification model for predicting at least one of flow characteristics or the first flow characteristic score of the first data flow.

10. The computer-implemented method of claim 1, wherein the first data flow includes a stream of uplink data originating from a mobile computing device that wirelessly communicates with a cell tower through an access network in at least a 5G telecommunication network.

11. The computer-implemented method of claim 1, wherein the first estimated aggregate load score is further based at least on:
  numbers of data packets being processed in a predetermined time by respective processors of the plurality of processors,
  numbers of connections of data flows at the respective processors of the plurality of processors, and
  a utilization rate of the respective processors of the plurality of processors.

12. A system comprising:
  a memory; and
  a processor configured to execute a method comprising:
  receiving a first data flow, wherein the first data flow includes at least one data packet;
  determining, using a deep packet inspection upon the at least one data packet, a first flow characteristic score of the first data flow, wherein the first flow characteristic score is based on a first weighted aggregate of attributes, the attributes characterize the first data flow according to at least a first estimated resource utilization and a first estimated processing time of processing the first data flow, and the first weighted aggregate of attributes is based on weighted attributes where weights are configurable based on respective degrees of influence of the attributes on a dynamic load balancing among a plurality of processors;
  generating a first estimated aggregate load score of a first processor of the plurality of processors for processing the first data flow, wherein the first estimated aggregate load score is based at least on a current aggregate load score of the first processor and the first flow characteristic score of the first data flow;
  selecting, based at least on the first estimated aggregate load score, the first processor of the plurality of processors for processing the first data flow, wherein selecting the first processor is based on the first processor being predicted to better satisfy the first estimated resource utilization and the first estimated processing time of the first data flow than at least a second processor of the plurality of processors; and
  causing the first processor to process the first data flow;
  determining, based on performance data of the plurality of processors, actual aggregate load scores of the plurality of processors;
  determining, based on a variance between the actual aggregate load scores and estimated aggregate load scores of the plurality of processors, to rebalance load levels among the plurality of processors; and
  dynamically updating, based on the variance, the estimated aggregate load scores of the plurality of processors.

13. The system of claim 12, the processor further configured to execute a method comprising:
  periodically retrieving the performance data of the plurality of processors;
  selecting, based on the updated estimated aggregate load scores, the second processor of the plurality of processors for processing the first data flow; and
  causing reassignment of the first data flow to the second processor of the plurality of processors.

14. The system of claim 12, wherein the plurality of processors includes a plurality of packet handlers of a core network server in at least a 5G telecommunication network.

15. The system of claim 12, the processor further configured to execute a method comprising:
  receiving a second data flow, wherein the second data flow is distinct from the first data flow, wherein the second data flow includes a stream of uplink data originating from a mobile computing device that wirelessly communicates with a cell tower through an access network,
  determining, using the deep packet inspection, a second flow characteristic score of the second data flow, wherein the second flow characteristic score is based on a second weighted aggregate of attributes representing at least a second estimated resource utilization and a second estimated processing time of processing the second data flow, and wherein the second flow characteristic score is distinct from the first flow characteristic score;
  generating a second estimated aggregate load score of the second processor of the plurality of processors for processing the second data flow, wherein the second processor is distinct from the first processor;
  selecting, based at least on the second estimated aggregate load score, the second processor of the plurality of processors for processing the second data flow, wherein selecting the second processor is based on the second processor being predicted to better satisfy a second resource utilization and a second processing time of the second data flow than at least a third processor of the plurality of processors; and
  causing the second processor to process the second data flow.

16. The system of claim 12, wherein the first flow characteristic score of the first data flow is based on at least one flow characteristic including at least one of:
  a data transmission protocol,
  a jitter sensitivity,
  a latency sensitivity,
  an application associated with the first data flow,
  a minimum network bandwidth for data transmission, or
  a minimum throughput for the data transmission.

17. A device for dynamically balancing load of processors based on flow characteristics of data flows, comprising:
  a memory; and
  a processor configured to execute a method comprising:
  periodically retrieving performance data of a first processor of a plurality of processors;
  retrieving an estimated aggregate load score for the first processor, wherein the estimated aggregate load score is based at least on a current aggregate load score of the first processor and a flow characteristic score of at least one data flow being processed by the first processor, wherein the flow characteristic score is based on a weighted aggregate of attributes, the attributes characterize the at least one data flow according to at least an estimated resource utilization and an estimated processing time of processing the at least one data flow, and the first weighted aggregate of attributes is based on weighted attributes where weights are configurable based on respective degrees of influence of the attributes on a dynamic load balancing among the plurality of processors;
  determining, based on a variance between an actual aggregate load score represented by the performance data for the first processor and the estimated aggregate load score for the first processor of the plurality of processors, to rebalance a load level of one or more processors of the plurality of processors;

dynamically updating, based on the variance, the estimated aggregate load score of the first processor of the plurality of processors;

selecting, based on the dynamically updated estimated aggregate load score, a second processor of the plurality of processors for processing the at least one data flow; and causing the second processor of the plurality of processors to process the at least one data flow according to the selection.

18. The device of claim 17, wherein the plurality of processors includes a plurality of packet handlers of a core network server in at least a 5G telecommunication network.

19. The device of claim 17, wherein the performance data include at least one of:

resource utilization of the first processor,
packets per second,
outstanding queue depth,
errors detected,
burst delay, or
a first flow characteristic score of a data flow being processed by the first processor.

20. The device of claim 17, wherein the flow characteristic score of at least one data flow is based on at least one flow characteristic including at least one of:

a data transmission protocol,
a jitter sensitivity,
a latency sensitivity,
an application associated with the at least one data flow,
a minimum network bandwidth for data transmission, or
a minimum throughput for the data transmission.

* * * * *